United States Patent

Kobayashi et al.

[11] Patent Number: 5,840,816
[45] Date of Patent: *Nov. 24, 1998

[54] METHOD OF MANUFACTURING A POLYSILOXANE CHARGE TRANSPORTING MATERIAL

[75] Inventors: Hideki Kobayashi, Ichihara; Nobuo Kushibiki, Fujisawa; Tohru Masatomi, Ichihara; Kikuko Takeuchi, Odawara, all of Japan

[73] Assignees: Dow Corning Toray Silicone Co., Ltd.; Dow Corning Asia, Ltd., both of Tokyo, Japan

[*] Notice: The term of this patent shall not extend beyond the expiration date of Pat. No. 5,712,360.

[21] Appl. No.: 743,600

[22] Filed: Nov. 4, 1996

[30] Foreign Application Priority Data

Nov. 6, 1995 [JP] Japan .................................. 7-287649

[51] Int. Cl.$^6$ .................................................. C08G 77/26
[52] U.S. Cl. .................................... 528/4; 528/38; 528/43
[58] Field of Search ................................ 528/34, 38, 43

[56] References Cited

U.S. PATENT DOCUMENTS

| | | | |
|---|---|---|---|
| 5,230,976 | 7/1993 | Schank et al. | 430/59 |
| 5,232,801 | 8/1993 | Rule et al. | 430/59 |
| 5,300,611 | 4/1994 | Fujioka et al. | 528/15 |
| 5,326,661 | 7/1994 | Sansone et al. | 430/20 |
| 5,436,099 | 7/1995 | Schank et al. | 430/59 |
| 5,688,961 | 11/1997 | Kushibiki et al. | 548/955 |
| 5,712,360 | 1/1998 | Kobayshi et al. | 528/38 |

FOREIGN PATENT DOCUMENTS

| | | |
|---|---|---|
| 224 784 A | 6/1987 | European Pat. Off. . |
| 446 895 A | 9/1991 | European Pat. Off. . |
| 457 212 A | 11/1991 | European Pat. Off. . |
| 61-132954 | 6/1986 | Japan . |
| 4-324454 | 11/1992 | Japan . |

OTHER PUBLICATIONS

Patent Abstracts of Japan, vol. 004, No. 146 (P–031), Oct. 15, 1980.

*Primary Examiner*—Margaret W. Glass
*Attorney, Agent, or Firm*—James E. Bittell

[57] ABSTRACT

The invention provides a method for manufacturing a polysiloxane resin with charge transporting property by uniformly dissolving a charge transporting material to a practical concentration in a polysiloxane resin. The charge transporting material that is dissolved in the polysiloxane resin is an aromatically substituted tertiary amine which has been modified by substitution of one or more of the aromatic groups with a hydrocarbon group containing a silyl group with hydrolyzable substituents.

14 Claims, No Drawings

METHOD OF MANUFACTURING A POLYSILOXANE CHARGE TRANSPORTING MATERIAL

BACKGROUND OF THE INVENTION

This invention is a method for manufacturing a polysiloxane charge transporting material of the kind used in electrophotographic apparatuses. The material is prepared by mixing a charge trasnporting material with a polysiloxane resin.

An organic photoconductor used in electrophotography must possess not only electrical and optical characteristics required for the electrophotographic process, but also the durability required for the charg-loading process and resistance to abrasive wear which is required for the process of removal of the toner from the organic photoconductor after the development and image-transfer operations. A recent trend in the development of organic photoconductor for electrophotography is to utilize organic compounds which are more suitable from the point of view of productivity and protection of the environment. Organic photoconductors are produced by dispersing or dissolving an organic compound with charge transporting properties in an acrylic resin, polycarbonate resin, polyester resin, polyurethane resin or a similar resin, and then to forming a layer of the resin over a charge-generation layer, or forming a layer of the resin in which a charge-generation substance is also dispersed.

Besides merely transporting a charge generated in a charge-generating layer from this layer to the surface of an organic photoconductor, the charge trsansporting layer used in the electrophotographic process should also possess appropriate electrical and mechanical properties. It is desirable that the resin of the charge transporting layer be resistant to corona discharge have other properties compatible with toner development, image transfer, and cleaning. The resin and dispersed charge transporting compounds should possess many other characteristics such as film-forming properties, etc. required for industrial production. Not all existing organic photoconductors, however, satisfy the requirements.

In an attempt to solve the problems, silicone materials have received some previous consideration because of their demonstrated stability against corona discharge and low surface-energy characteristics. Thus, attempts to improve surface characteristics of an organic photocondutor described by using silicone-oil additives in Japanese Laid-Open Patent Publication (Kokai) No. 61-132954 and by using silicone-resin powder in (Kokai) No. 4-324454. Studies were also conducted with regard to materials for protecting the surface of an organic photoconductor by using block copolymers of polycarbonate with the addition of a cross-linking silicone resin, a silicone-modified polyurethane, and a silicone-modified polyester.

Since polysiloxane resin is not sufficiently compatible with other resins, simple mixing with other resins causes phase separation and often results in components bleeding to the surface of the mixed resin. These properties can be improved by using block copolymers. However, as is known from the chemistry of polymers, block copolymers which are composed of essentially non-compatible resins have a phase-separation structure. Furthermore, since polysiloxane resin in general is electrically neutral and inactive and since, when used alone, it has no charge transporting properties, such functions is acquired by adding a charge trasnporting compound to the resin. However, polysiloxane resin is generally a low-molecular weight polymer which does not easily disperse and uniformly dissolve other compounds.

It is an object of the present invention to provide a method of manufacturing a polysiloxane resin with charge transporting properties by uniformly dissolving in a polysiloxane resin in an appropriate concentration a charge transporting compound for imparting a charge transporting function to the polysiloxane resin.

SUMMARY OF THE INVENTION

The invention is a method of manufacturing a polysiloxane material having charge transporting properties, the method comprising:

dissolving a charge transporting material having an ionization potential within the range of 4.5 to 6.2 eV and represented by the formula:

wherein A denotes an organic group derived from a charge transporting compound having the ionization potential of 4.5 to 6.2 eV, which is an aromatically substituted tertiary amine having a plurality of aromatic groups where at least one of the aromatic hydrocarbon groups is bonded to $R^1$ which is an alkylene group having 1 to 18 carbon atoms; $R^2$ is a monovalent hydrocarbon group or a halogen-substituted monovalent hydrocarbon group having 1 to 15 carbon atoms; Q is a hydrolyzable group; n is an integer from 1 to 3; p is an integer from 1 to 3 and a curable polysiloxane resin having a ratio of monovalent hydrocarbon groups to silicon atoms in a range of 0.5 to 1.5 in an organic solvent which is essentially free of water;

mixing the charge transporting material and curable polysiloxane resin to form a mixture thereof;

and curing the mixture.

DESCRIPTION OF THE PREFERRED EMBODIMENTS

This invention provides an organic photoconductive layer made of a polysiloxane material which has high surface hardness, low surface tension, and excellent resistance to the surrounding environment which is stable even against a corona discharge. More specifically, the invention provides a polysiloxane charge trasnporting material. The material may be used, e.g., for the manufacture of a drum coated with an organic photoconductor layer. An organic photoconductive coating made of the above material will possess improved durability and resistance to the surrounding environment.

The charge transporting material represented by the formula

wherein A denotes an organic group derived from a charge transporting compound having the ionization potential of 4.5 to 6.2 eV, which is an aromatically substituted tertiary amine having a plurality of aromatic groups where at least one of the aromatic hydrocarbon groups is bonded through the $R^1$ group to a silyl group having 1 to 3 hydrolyzable groups denoted as Q in the formula. Examples of hydrolyzable Q groups include a hydroxyl group, alkoxy group, methylethyl ketoximo group, diethylamino group, acetoxy group, propenoxy group, chloride, etc. Preferable groups are a hydroxyl group as well as a methoxy group, ethoxy group, butoxy group, propoxy group and similar alkoxy groups having 1 to 6 carbon atoms. $R^1$ is an alkylene group having 1 to 18 carbon atoms. $R^2$ is a monovalent hydrocarbon group or a halogen substituted monovalent hydrocarbon group having 1 to 15 carbon atoms.

By mixing the a charge transporting material with a polysiloxane resin in an organic solvent which is essentially free of water and then curing the mixture, it becomes possible to uniformly dissolve a large quantity of the charge transporting material in the polysiloxane resin.

The charge transporting material for use in the invention has an organosilicon group bonded to an electron donating group via a hydrocarbon group. Use of the hydrocarbon group to bind the silyl group to the aromatic group is preferred because in the case of a direct bonding, the π electron of the aromatic ring will have a π–d interaction with the d electron of silicon. This interaction causes a shift in the ionization potential from that of the starting material. To obviate this problem, the spacer hydrocarbon group is used, which enable much easier designing of an organic photoconductor.

One of an example of the method for introduction of a hydrocarbon group between a silicon atom and one of the aromatic rings consists bonding an unsaturated aliphatic group substituted on an aromatic ring of the charge transporting material to an alkoxysilane having hydrogen atom and alkoxy group as substitutents of silicon atom by hydrosilylation reaction. For example, the charge transporting material has an aromatic group and can be produced as a result of a reaction between a vinyl group substituted on an aromatic ring bonded to nitrogen of an aromatically substituted tertiary amine having an ionization potential within the range of 4.5 to 6.2 eV and an organic silicon compound having a hydrogen atom. Furthermore, a vinyl group may be introduced into an aromatic group by formylation of a methyl group or a hydrogen atom subsituted on an aromatic ring, with Witting reaction of aldehyde. The hydrosilylation reaction can then be applied. In another method. a saturated hydrocarbon group substituted in the aromatic ring, e.g., a methyl group, is bromomethylated, then a lithio-complex is formed and is caused to react with a halogenated alkoxysilane. The ionization potential is measured under atmospheric pressure by means of photoelectron spectrometer (AC-1 surface analyzer from Riken Keiki Co., was ued).

The aromatically substituted tertiary amine with an ionization potential of 4.5 to 6.2 eV which is to be used in the manufacturing method of this invention may be one of the following. In the formulas described below, Me denotes methyl, while Et denotes ethyl.

10D —Oxidation potential: 0.76 V Ionization potential: 5.41 eV
11A—Oxidation potential: 0.58 V Ionization potential: 5.23 eV
11B—Oxidation potential: 0.58 V Ionization potential: 5.23 eV
11C—Oxidation potential: 0.63 V Ionization potential: 5.28 eV
11D—Oxidation potential: 0.77 V Ionization potential: 5.41 eV
12A—Oxidation potential: 0.83 V Ionization potential: 5.47 eV
12B—Oxidation potential: 0.83 V Ionization potential: 5.47 eV
12C—Oxidation potential: 0.84 V Ionization potential: 5.47 eV
12D—Oxidation potential: 0.83 V Ionization potential: 5.47 eV
13A—Oxidation potential: 0.83 V Ionization potential: 5.47 eV
13B—Oxidation potential: 0.85 V Ionization potential: 5.48 eV
13C—Oxidation potential: 0.74 V Ionization potential: 5.38 eV
13D—Oxidation potential: 0.80 V Ionization potential: 5.44 eV
14A—Oxidation potential: 0.83 V Ionization potential: 5.41 eV
7A—Oxidation potential: 0.80 V Ionization potential: 5.44 eV
7B—Oxidation potential: 0.79 V Ionization potential: 5.43 eV
7C—Oxidation potential: 0.88 V Ionization potential: 5.51 eV
8A—Oxidation potential: 0.76 V Ionization potential: 5.40 eV
8B—Oxidation potential: 0.74 V Ionization potential: 5.38 eV
8C—Oxidation potential: 0.77 V Ionization potential: 5.41 eV
9A—Oxidation potential: 0.63 V Ionization potential: 5.28 eV
9B—Oxidation potential: 0.62 V Ionization potential: 5.27 eV
9C—Oxidation potential: 0.58 V Ionization potential: 5.22 eV
9D—Oxidation potential: 0.59 V Ionization potential: 5.23 eV
10A—Oxidation potential: 0.80 V Ionization potential: 5.44 eV
10B—Oxidation potential: 0.78 V Ionization potential: 5.43 eV
10 C—Oxidation potential: 0.78 V Ionization potential: 5.43 eV Following are representative ionization and oxidation potentials for some of the aromatic substituted tertiary amines A shown above. These ionization and oxidation potentials refer to the specific compounds identified above with corresponding reference indicia.

1A—Ionization potential: 5.7 eV
1B—Oxidation potential: 0.78 V Ionization potential: 5.42 eV
1C—Oxidation potential: 0.81 V Ionization potential: 5.45 eV
3A—Oxidation potential: 0.84 V Ionization potential: 5.47 eV
5A—Oxidation potential: 0.57 V Ionization potential: 5.22 eV
5B—Oxidation potential: 0.75 V Ionization potential: 5.40 eV
5C—Oxidation potential: 0.76 V Ionization potential: 5.40 eV
5D—Oxidation potential: 0.86 V Ionization potential: 5.49 eV
6A—Oxidation potential: 0.76 V Ionization potential: 5.40 eV
6B—Oxidation potential: 0.79 V Ionization potential: 5.43 eV
6C—Oxidation potential: 0.75 V Ionization potential: 5.40 eV
6D—Oxidation potential: 0.77 V

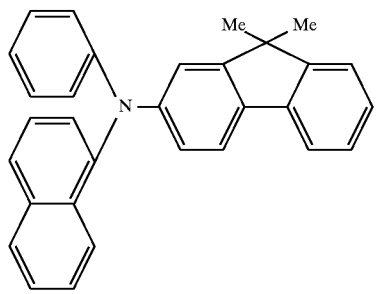 18A
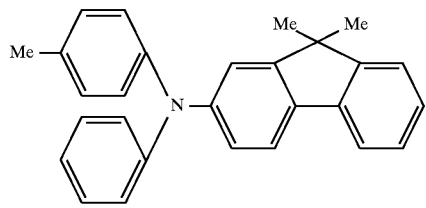 18B
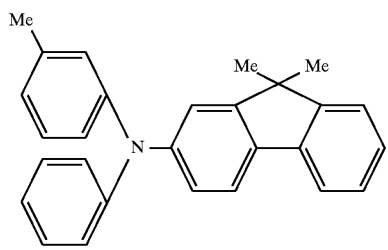 18C
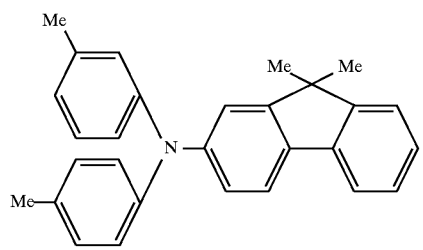 18D
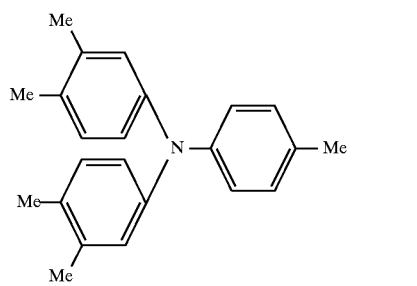 17A
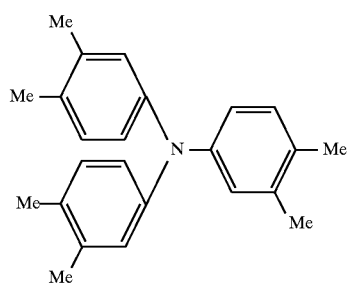 17B

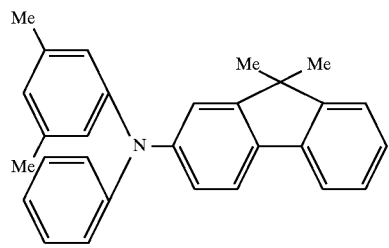
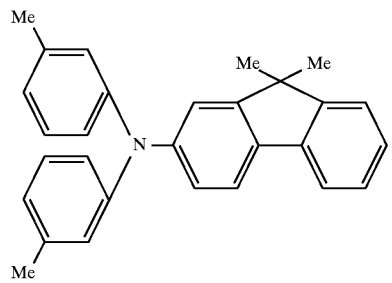
17C
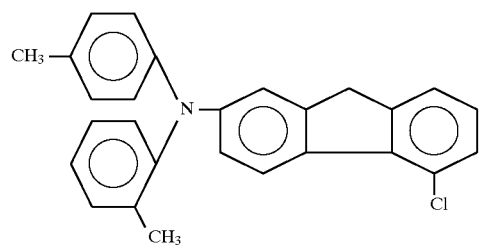
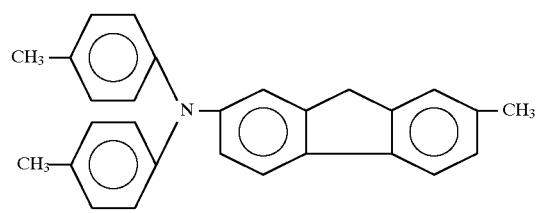
17D
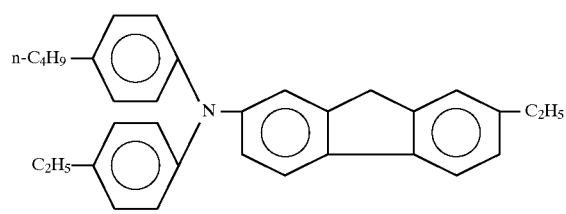
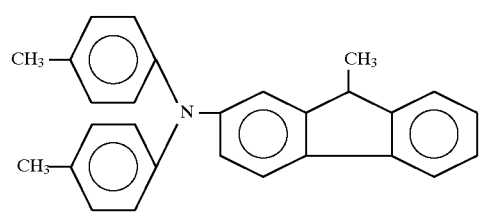
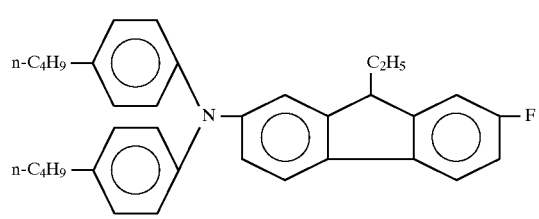

-continued
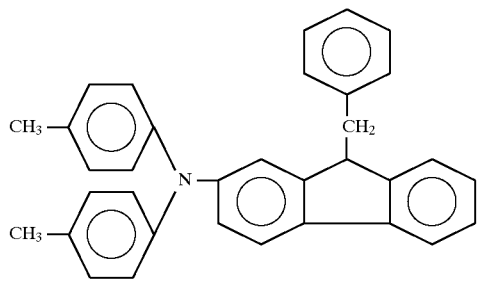
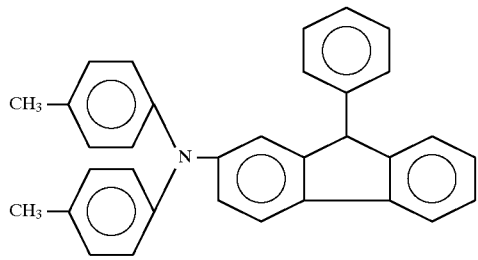
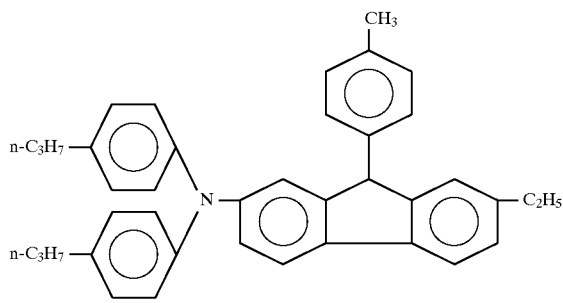
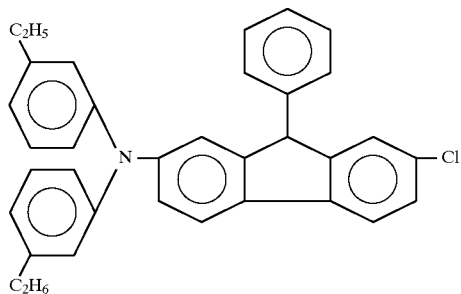
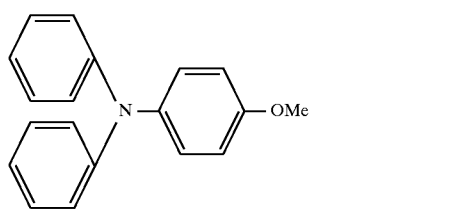
14A
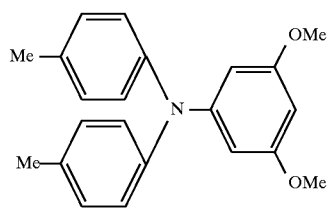
14B

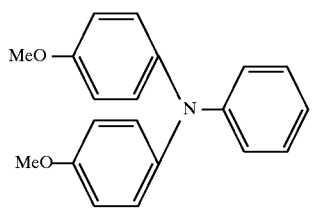 14C
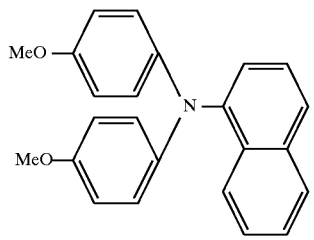 14D
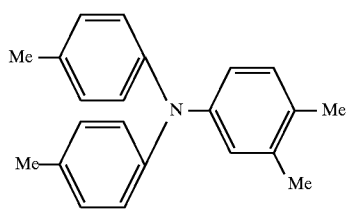 14E
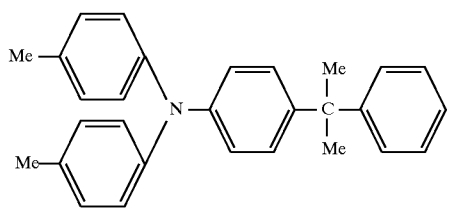 13A
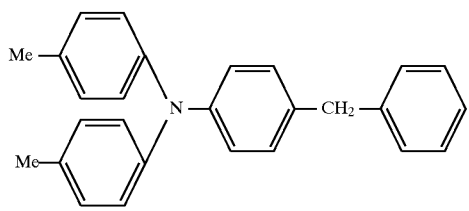 13B
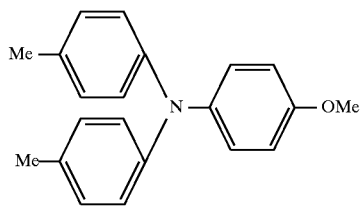 13C
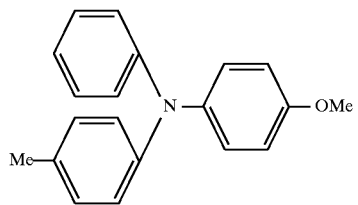 13D -continued
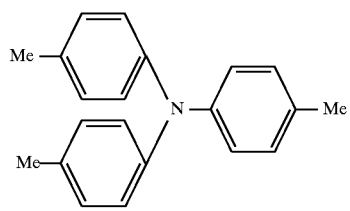
12A
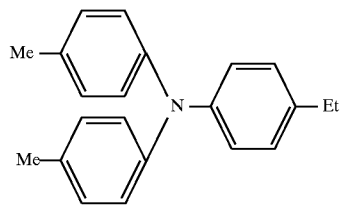
12B
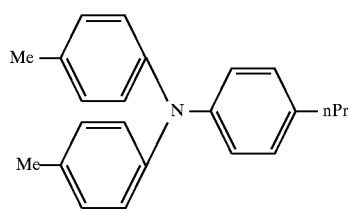
12C
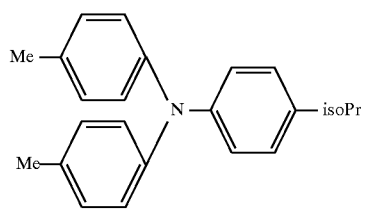
12D
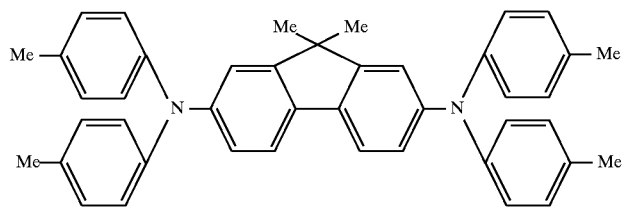
11A
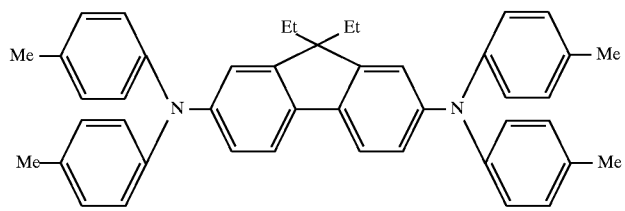
11B
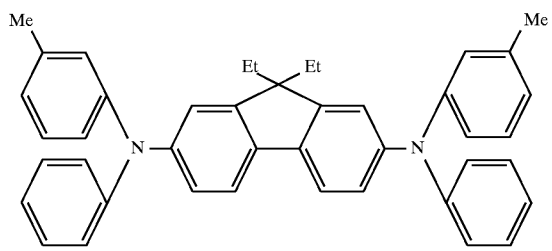
11C

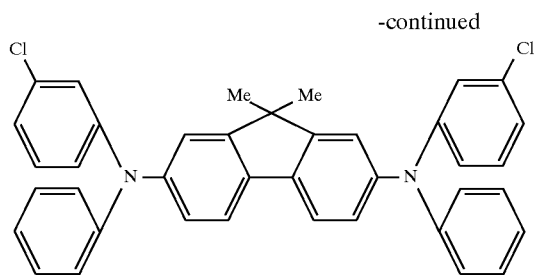
11D
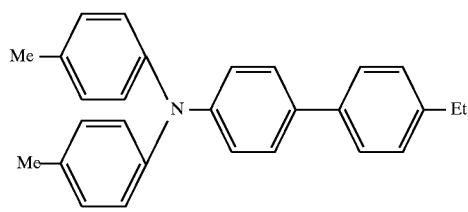
10A
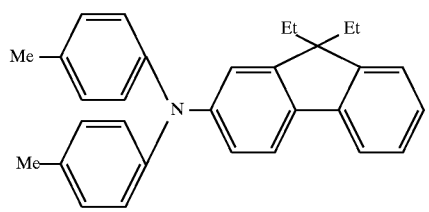
10B
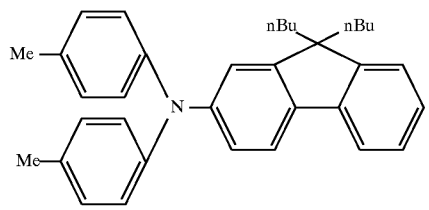
10C
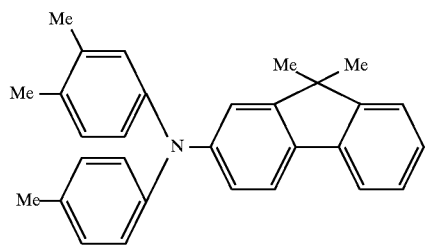
10D
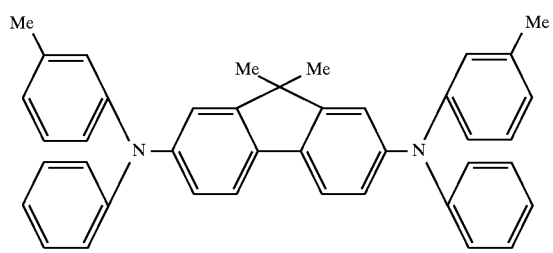
9A
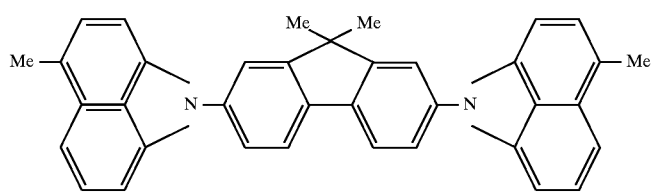
9B -continued
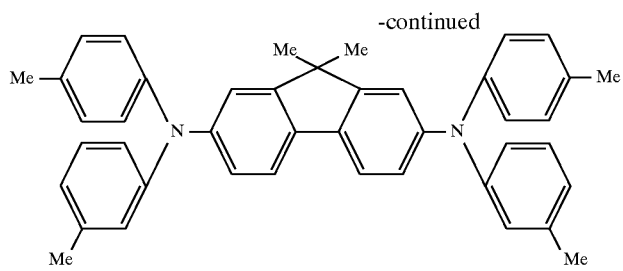 9C
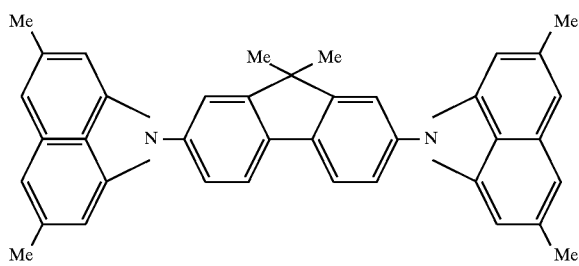 9D
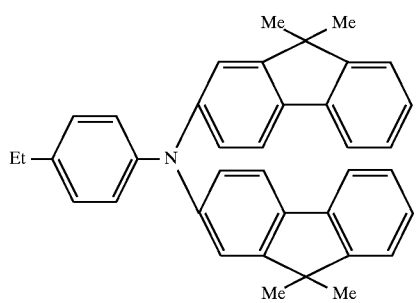 8A
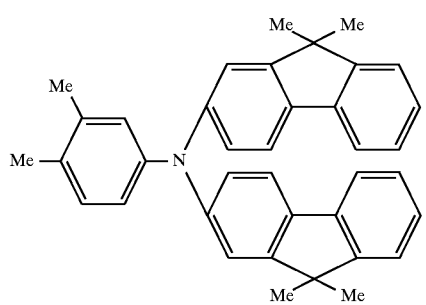 8B
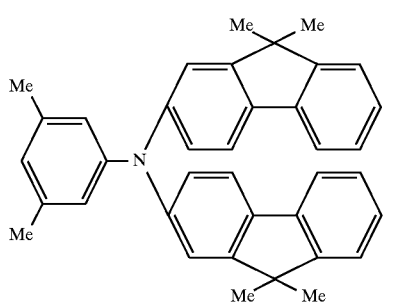 8C
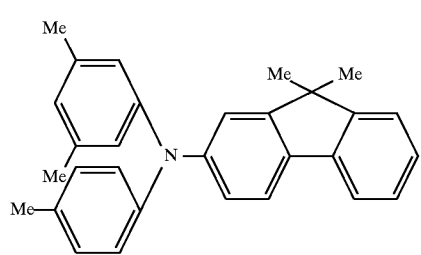 7A

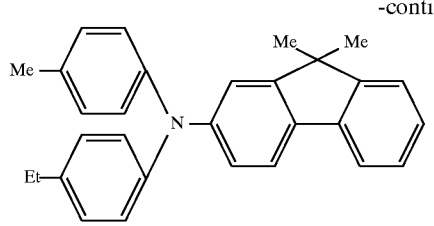 7B
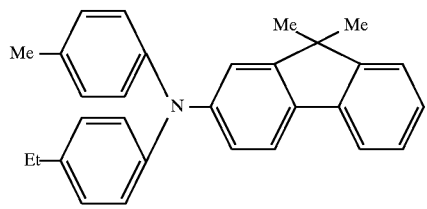 7C
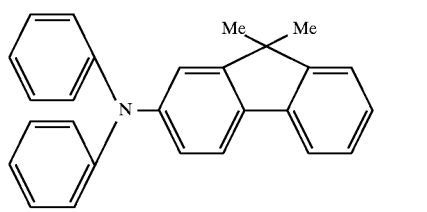 6A
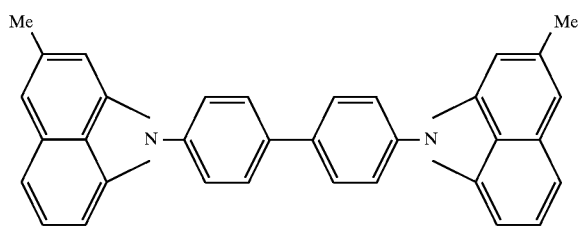 6B
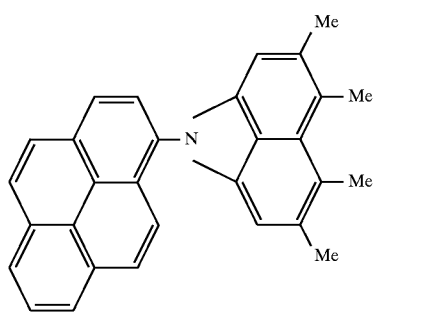 6C
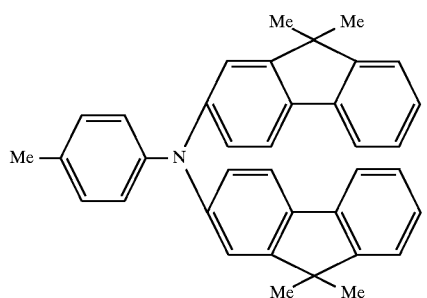 6D
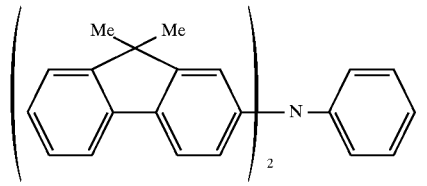 5A

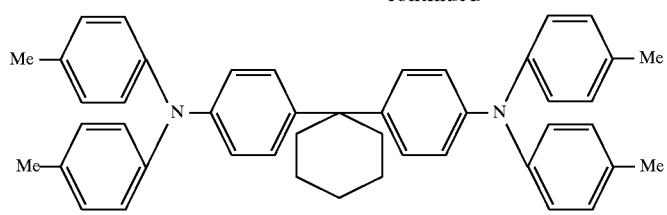
5B
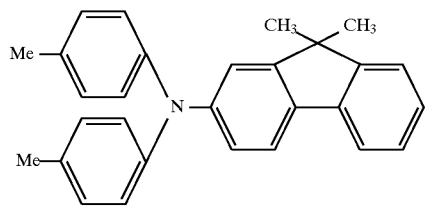
5C
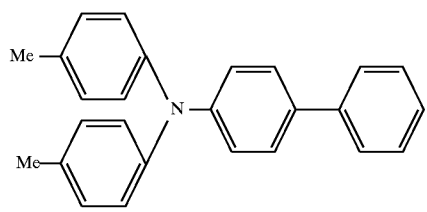
5D
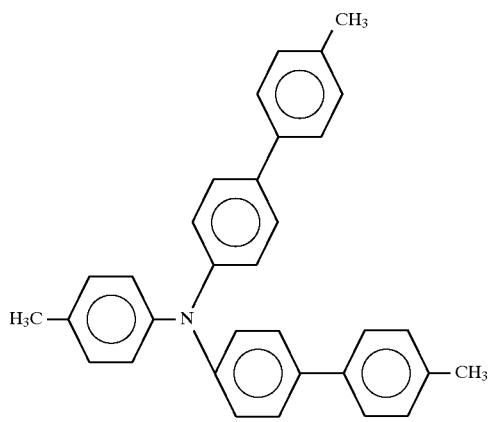
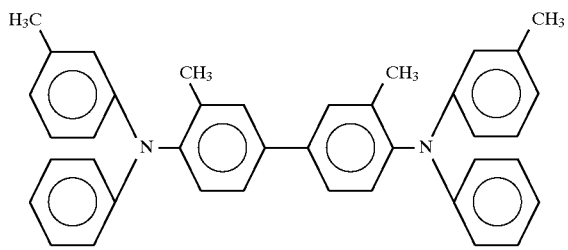
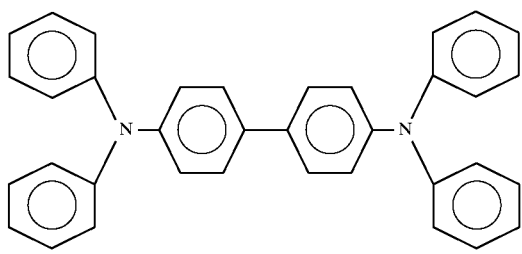

-continued
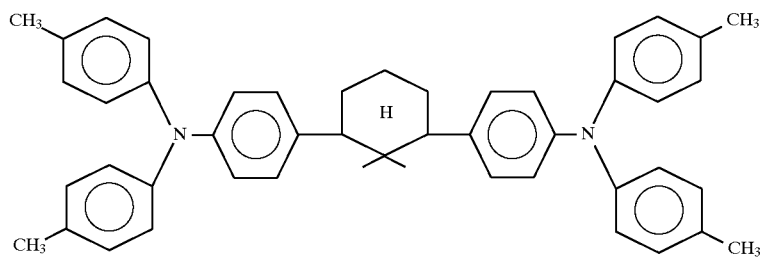
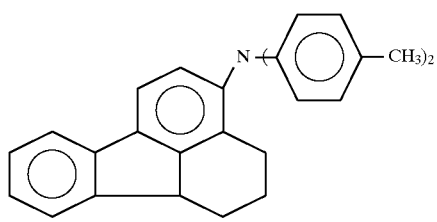
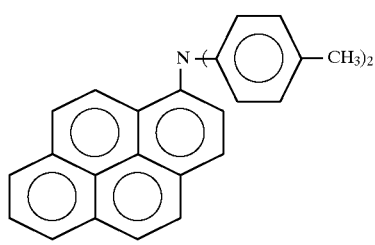
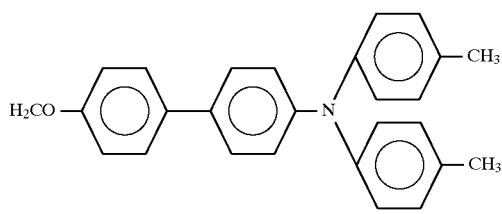
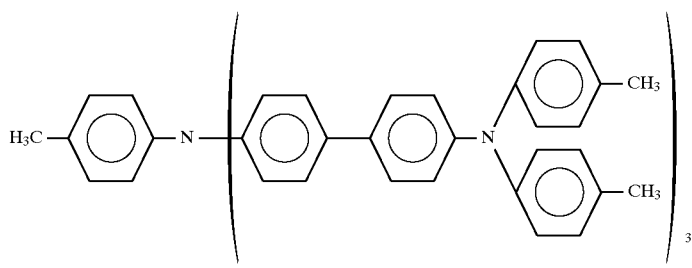
3A
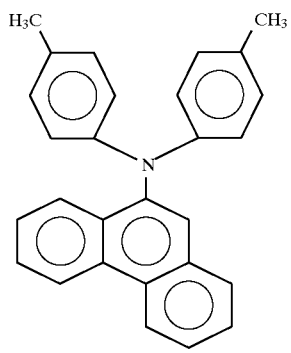

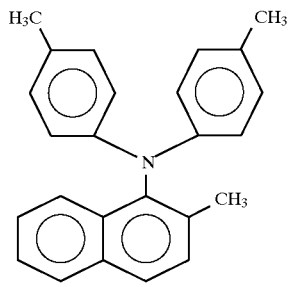
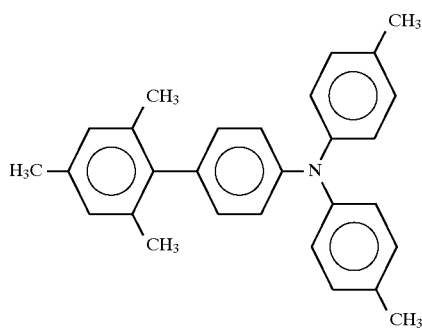
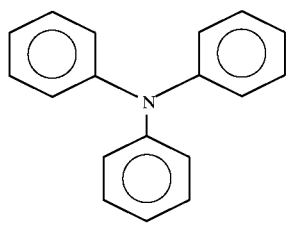
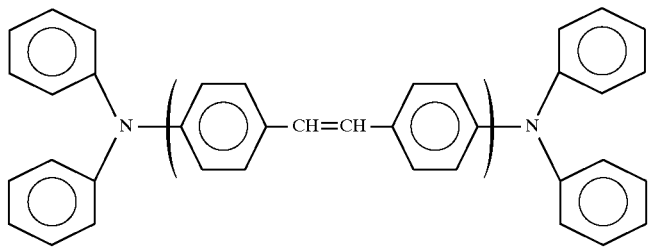
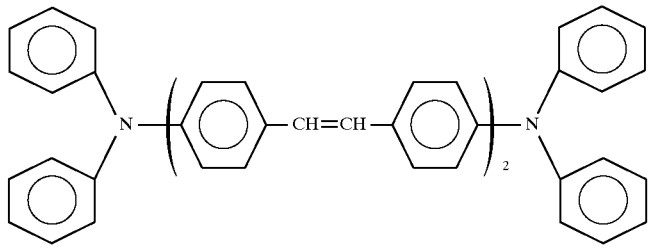
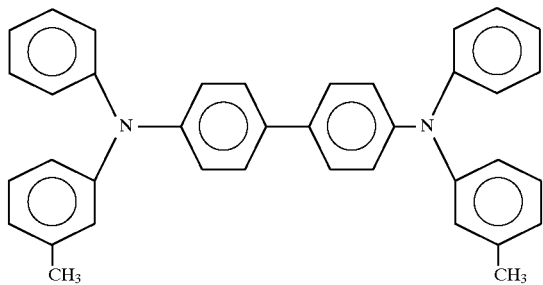
1A
1B

-continued

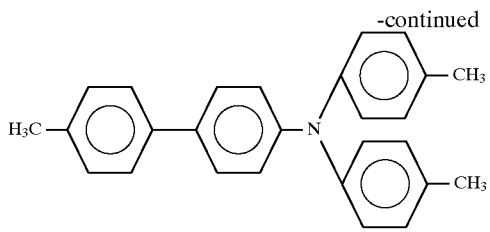

1C

Ionization potential: 5.47 eV
14B—Oxidation potential: 0.84 V Ionization potential: 5.47 eV
14C—Oxidation potential: 0.72 V Ionization potential: 5.36 eV
14D—Oxidation potential: 0.73 V Ionization potential: 5.38 eV
14E—Oxidation potential: 0.81V Ionization potential: 5.45 eV
17A—Oxidation potential: 0.78 V Ionization potential: 5.43 eV
17B—Oxidation potential: 0.76 V Ionization potential: 5.40 eV
17C—Oxidation potential: 0.82 V Ionization potential: 5.46 eV
17D—Oxidation potential: 0.82 V Ionization potential: 5.45 eV
18A—Oxidation potential: 0.89 V Ionization potential: 5.52 eV
18B—Oxidation potential: 0.81 V Ionization potential: 5.45 eV
18C—Oxidation potential: 0.84 V Ionization potential: 5.47 eV
18D—Oxidation potential: 0.79 V Ionization potential: 5.43 eV A method for introducing a silyl group having hydrolyzable group to an aromatically substituted, tertiary amine by the reaction of aforementioned organosilicon hydride with said aromatically substituted, tertially amine, is detailed, referring to alkoxysilyl group as representative embodiment of the silyl group having hydrolyzable group, as follows:

There are no particular limitations as to which position on the aromatic ring which the silyl group is to be introduced, nor is it necessary for the silyl groups to be bonded to all aromatic rings. The determination is made in consideration of factors such as the solubility in the polysiloxane resin.

The method of introducing a vinyl group to an aromatic group substituted on a nitrogen atom is to formylate a methyl group or a hydrogen atom subsitituted on a aromatic ring. The vinyl group is then introduced by Witting reaction of aldehyde product. It can also be produced by means of dehydrohalogenation reaction between a hydrogen on a secondary amine and a halogenated aromatic group compound bearing a vinyl group.

The hydrosilane compound which reacts with the vinyl group bonded to the aromatically substituted tertiary amine is a silicon compound containing both a hydrogen and at least one hydrolyzable substituent such as an alkoxy group. This compound is added to the vinyl group by means of a hydrosilylation reaction. Hydrogen which is directly bonded to silicon is an indispensable component of the hydrosilylation reaction to add to the vinyl group; another indispensable component is a hydrolyzable group, such as the alkoxy group. The $R^3$ of such alkoxy group-$OR^3$ is selected from relatively short carbon chains of 1 to 6 carbon atoms such as methyl, ethyl, propyl, butyl, amyl, and hexyl, or branched alkyls, depending on the intended use of the product, according to the stability during the hydrosilylation process and the hydrolyzable property. The n in the formula denotes the number of Q groups such as alkoxy groups substituting silicon; when the number is higher than 1, the hydrophilic property of the compound is increased; when there are several groups that are able to be condensed, the compound also acts as a cross-linking agent, so selections must be made taking into consideration the hardness of the polysiloxane resin as a result of cross-linking, as well as its hydrophilic property.

The organic group $R^2$ may be selected as appropriate according to the type of substituent on the silicon in the polysiloxane resin, and according to the various purposes such as the solubility in the resin, reactivity during the hydrosilylation reaction, and other property adjustments of the polysiloxane resin. Typical $R^2$ groups include alkyl groups such as methyl, ethyl, propyl, butyl, amyl, and hexyl; aryl groups such as phenyl and tolyl, alkenyl groups such as vinyl and allyl; halogenated hydrocarbon groups such as chloropropyl; and fluorohydrocarbon groups represented by trifluoropropyl, heptafluoropentyl, and nonafluorohexyl. If the substituent on the silicon in the polysiloxane is methyl, generally the solubility is better if $R^2$ is a methyl group.

The curable polysiloxane resin is a polymer the main structural unit of which is represented by the formula:

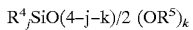

where $R^5$ is a hydrogen atom or an alkyl group with 1 to 4 carbon atoms and $R^4$ is a linear or a branched saturated hydrocarbon group having 1 to 18 carbon atoms, j is a number between 0.5 and 1.5, and K is a number that provides $OR^5$ groups in the branched or linear polysiloxane in an amount of 0.01 to 10 wt. %.

In order to provide mechanical characteristics such as resistance to abrasive wear, it is recommended that the substitution number j of monovalent hydrocarbon groups per silicon atom be within the range of 0.5 to 1.5. If it is lower than 1, the structure will be close to glass, and if it is lower than 0.5, it would be difficult to form a film. When j exceeds 1, the tendency is opposite, and with j equal to 2 a polydimethylsiloxane is formed. When it exceeds 1.5, rubber properties begin to prevail, and mechanical strength decreases. The monovalent hydrocarbon group $R^4$ which is bonded directly to a silicon atom may be a saturated straight or branched hydrocarbon group with 1 to 18 carbon atoms such as, e.g., a methyl, ethyl, propyl, butyl, amyl, hexyl, 2-ethylhexyl, dodecyl, octadecyl group, etc., an alkenyl group such as vinyl, allyl, etc., an aryl group such as phenyl, tolyl, a halogenated hydrocarbon group, e.g., trifluoropropyl, heptafluoropentyl, nonafluorohexyl or a similar fluorohydrocarbon group, as well as a chloromethyl, chloroethyl group or a similar halogen-substituted saturated hydrocarbon group. It is not necessary that the monovalent hydrocarbon groups which are connected directly to silicon atoms be groups of the same type. These groups may be optionally selected for the purpose of improving resin properties, solubility in the solvent, etc. It is known, for example, that a system with both methyl groups and phenyl groups provides better affinity with respect to organic compound than methyl groups alone.

In the present invention, $R^5$ in the $OR^5$ group may be a hydrogen atom, a methyl group, ethyl group, propyl group, butyl group, or a similar lower alkyl group. When $R^5$ is an alkyl group, an increase in the size of the alkyl group reduces its hydrolizability but further improves stability. Specific $OR^5$ groups should be selected according to the characteristics desired. It is preferred that k has a value such that the resin contains 0.01 to 10 wt. %, more preferably 0.1 to 4.0 wt. % of the $OR^5$ groups. When this range is exceeded, the polysiloxane resin looses stability in storage, and when k is below the lower recommended limit, the polysiloxane resin cures insufficiently during the film-formation.

Addition of a cross-linking agent to the resin composition ensures cross-linking of its structure. There are no special limitations with regard to the cross-linking agent, provided it is an organosilicon compound having two or more hydrolyzable groups bonded to a silicon atom. These hydrolyzable groups are represented by a hydroxyl group, methoxy group, ethoxy group, propoxy group, butoxy group, methylethylketoximo group, diethylamino group, acetoxy group and propyloxy group. There are no special limitations also with regard to substituents that may be bonded to silicon atoms other than hydrolyzable groups, provided they are monovalent hydrocarbons. A catalyst is not always necessary for curing the resins, but it is not precluded to use a curing catalyst of the type utilized for curing conventional silicone resins. With regard to the curing temperature and the time required for curing, such a catalyst may be selected from the group consisting of dibutyltin diacetate, dibutyltin dilaurate, dibutyltin dioctoate or a similar alkyltin organic acid salt, and butyltitanate or a similar titanic acid ester.

A method for the manufacture of a polysiloxane resin of the present invention is disclosed in Japanese Patent Publications [Kokoku] 26-2696 and [Kokoku] 28-297. Further synthesis methods for polysiloxane polymers are described in "Chemistry and Technology of Silicones" by Walter Noll, Academic Press, Inc., 1968, p. 191. For example, a synthesis may be carried out by dissolving an appropriate alkoxy silane or halosilane having a substitution number j of monovalent hydrocarbon groups per silicon atom within the range of 0.5 to 1.5 in an organic solvent which is free of water, and then polymerizing by hydrolyzing and condensing in the presence of an acid or a base, with subsequent removal of the solvent. The polysiloxane resin may be dissolved in an organic solvent such as toluene, xylene or a similar aromatic hydrocarbon, cyclohexane, hexane, or a similar aliphatic hydrocarbon, or a halogenated hydrocarbon.

It is recommended that in the final cured polysiloxane material having charge transporting properties the charge transporting material represented in an amount of 20 to 200 parts by weight per 100 parts by weight of the polysiloxane resin. If it is used in an amount less than 20 parts by weight, the material will have insufficient charge-transporting property. The sensitivity will be lowered. If it is used in an amount exceeding 200 parts by weight, it will impair the mechanical strength. It is preferred, therefore, that the range be between 30 and 150 parts by weight. It is better to. dissolve the resin in a solvent in an amount of 5 to 80 wt. %. The specific concentration should be selected according to the purpose and the specific application of the material.

The charge trasnporting material and the polysiloxane resin can be mixed by dissolving both in a solvent and then mixing the components mechanically by known methods. Solvents suitable for the mixing process include any organic solvent which is essentially free of water. In the context of this application, the phrase "essentially free of water" means that the solvent is sufficiently free of water such that when the charge transporting material is dissolved in the solvent, it does not hydrolyze and condense to form polymeric species separate from the polysiloxane resin. The solvent should also be selected so as not to affect other materials used in the construction of the organic photoconductor. It is recommended to perform mixing without an increase in temperature under an inert anhydrous gas. If mixing is carried out with heating, cooling should be used for limiting cross-linking of the resin during mixing.

Application of the uncured resin may be carried out by applying the dissolved materials on a substrate by conventional methods such as dipping, spraying, spinning, etc. After the application of the coating material, the coating is heated to a temperature close to the boiling point of the solvent, whereby the residual solvent is removed, and then a coating film of a polysiloxane having charge transporting properties is formed by curing the coating at a temperature within the range from room temperature to 150° C. Within the range of mixing of the components described above, the coating film prepared by the method will be transparent, free of visible aggregates of the charge transporting material, and will have a thickness from several microns to several tens of microns. If a non-modified charge transporting material is admixed, addition thereof even in an amount of several parts by weight will cause problems associated with separation and precipitation of the charge transporting material, whitening of the coating film, and loss of transparency. Probably, the hydrolyzable groups bonded to silicon in the charge transporting material do not play a significant role in improving affinity with polysiloxane resin, but rather improve solubility by interacting, due to condensation during curing, with alkoxy groups or residual silanol groups in the polysiloxane resin and thus curing a portion or an appropriate amount in the resin.

SYNTHESIS EXAMPLE 1

Synthesis of 4-(N, N-diphenylamino) benzaldehyde 101.4 g of triphenylamine and 35.5 mL of DMF were placed in a three-neck flask, and while stirring with cooling in ice water, 84.4 mL of phosphorus oxychloride was dripped into the flask; the reaction mixture was hold at 95° C. for 5 hours. It was poured into 4 L of hot water and stirred for 1 hour. The precipitate was then collected and washed with a 1:1 mixture of ethanol/water, and 4-(N, N-diphenylamino) benzaldehyde was obtained. The yield was 91.5 g (81.0%).

Synthesis of 4-vinyltriphenylamine 4.6 g of sodium hydride and 700 mL of 1, 2-dimethoxyethane were placed in a three-neck flask, and while stirring at room temperature, 130.8 g of tetramethylphosphonium bromide was added. After adding one drop of anhydrous ethanol, the mixture was stirred for 4 hours at 70° C. Then 100 g of 4-(N, N-diphenylamino) benzaldehyde was added; the mixture was hold at 70° C. for 5 hours. The solution was filtered, and an ether extract of the precipitate and the filtrate were washed with water. Next, the ether solution was dried over calcium chloride, the ether was removed, and the crude product was obtained. This was recrystallized from ethanol, and a needle-form, lemon- yellow vinyltriphenylamine was obtained. The yield was 83.4 g (84.0%). Synthesis of 4-[2 (triethoxysilyl) ethyl] triphenylamine 15 40 mL of toluene, 9.9 g (60 mmol) of triethoxysilane, and 0.018 mmol of a tris (tetramethyldivinyldisiloxane) platinum (0) complex in a toluene solution were placed in a three-neck flask, and while stirring under room temperature, 20 mL of a toluene solution of 8.2 g of 4-vinyltriphenylamine was added. Upon completion of the addition, the mixture was stirred for 3 hours at 70° C., then the. solvent was removed under reduced pressure. As a result, a lemon-yellow oily substance of 4-[2-(triethoxysilyl) ethyl] triphenylamine was obtained. The amount obtained was 12.1 g (91.7%).

SYNTHESIS EXAMPLE 2

Synthesis of 4-[2-(methyldiethoxysilyl)ethyl] triphenylamine 40 mL of toluene, 8.1 g of methyldiethoxysilane, and 0.018 mmol of tris(tetramethyldivinyldisiloxane) platinum (0) complex in a toluene solution were placed in a three-neck flask, and while stirring under room temperature, 20 mL of a toluene solution of 8.2 g of 4-vinyltriphenylamine was added. Upon completion of the addition, the mixture was stirred for 3 hours at 70° C., then the solvent was removed under reduced pressure. As a result, a lemon-yellow oily substance of 4-[2-(methyldiethoxysilyl) ethyl] triphenylamine was obtained. The amount obtained was 11.2 g (91.4%).

SYNTHESIS EXAMPLE 3

Synthesis of tri(4-formylphenyl amine 50.7 g of triphenylamine and 53.3 mL of DMF were placed in a three-neck flask, and while stirring with cooling in ice water, 126.6 mL of phosphorus oxychloride was added. Upon completion of the addition, the mixture was Stirred for 5 hours at 95° C., then poured into 5 L of hot water, and stirred for 1 hour. The precipitate was collected by filteration and washed with a 1:1 solution of ethanol/water. As a result, tris(4-formylphenyl)amine was obtained in an amount of 65.3 g (95.9%).

Synthesis of tri (4-vinylphenyl) amine 14.6 g of sodium hydride and 700 mL of 1, 2-dimethoxyethane were placed in a three-neck flask, and while stirring at room temperature, 130.8 g of tetramethylphosphonium bromide was added. One drop of anhydrous ethanol was then added, the mixture was stirred for 4 hours at 70° C. 40.2 g of tri(4-formylphenyl)amine was then added, and the reaction was continued for 5 hours at 70° C. The reaction mixture was filtered, the filter cake was extracted with ethanol, and after being combined with the filtrate, was washed with water. After drying the ether solution over calcium chloride, ether was removed, and a crude product was obtained. This product was recrystallized from ethanol twice. As a result, tri(4-vinylphenyl)amine was obtained as a needle-like lemon-yellow solid. The amount obtained was 38.4 g (97.3%).

Synthesis of 4,4',4"-tris [2-(triethoxysilyl) ethyl] triphenylamine 40 mL oftoluene, 9.9 g (60 mmol) of triethoxysilane, and 0.018 mmol of tris(tetramethyldivinyldisiloxane) platinum (0) complex in a toluene solution were placed in a three-neck flask, and while stirring under room temperature, 20 mL of a toluene solution of 3.3 g (13 mmol) of tri (4-vinylphneyl) amine was added. Upon completion of the addition, the mixture was stirred for 3 hours at 70° C., then the solvent was removed under reduced pressure. As a result, a lemon-yellow oil of 4,4',4'-[2-(triethoxysilyl) ethyl] triphenylamine was obtained in an amount of 7.8 g (80.6%).

SYNTHESIS EXAMPLE 4

Synthesis of N, N-bis(3,4-dimethylphenyl) aminobenzene 38.5 g (166 mmol) of 4-iodo-o-xylene, 22.9 g (166 mmol) of anhydrous potassium carbonate, and 7.0 g of copper powder were added to 20 mL of nitrobenzene while stirring, and refluxed for 8 hours. The mixture was cooled, then filtered, and the filtrate was removed. The obtained reaction mixture was passed through a silica gel column, and N, N-bis (3,4-dimethylphenyl) aminobenzene was obtained. The obtained amount was 15.7 g (yield rate of 69%).

Synthesis of 4-[N, N-bis(3,4-dimethylphenyl) amino]benzoaldehyde 12.6 g of N,N-bis(3,4-dimehylphenyl)aminobenzene and 35.5mL of DMF were placed in a three-neck flask, and then 84.4 mL of phosphate oxychloride were added dropwise while stirring. Upon completion of the addition, the mixture was stirred for 5 hours at 95° C. The reaction mixture was poured into 4 L of hot water, and the mixture was stirred for 1 hour. The precipitate was separated by filteration and washed with a 1:1 ethanol/water solution. As a result, 4-[N, N-bis (3, 4-dimethylphenyl) amino] benzoaldehyde was obtained in an amount of 107.6 g (79.0%).

Synthesis of 4-[N, N-bis(3,4-dimethylphenyl)] aminostyrene 12.1 g of sodium hydride and 580 mL of 1, 2-dimethoxyethane were placed in a three-neck flask, and while stirring at room temperature, 108.5 g of tetramethylphosphonium bromide was added. After adding one drop of anhydrous ethanol, the mixture was stirrred for 4 hours at 70° C. 100.0 g of 4-[N, N-bis(3,4dimethylphenyl)amino] benzaldehyde was added to the mixture, and the mixture was stirred for 5 hours at 70° C. The reaction mixture was filtered, and the filter cake was extracted with ether, and after being combined with the filtrate, was washed with water. Next, the ether solution was dried over calcium chloride, the ether was removed, and the crude product was obtained. This was recrystallized twice from ethanol, and a needle-form, 4-[N, N-bis (3,4dimethylphenyl)amino]styrene was obtained in an amount of 84.5 g (85.0%).

Synthesis of 4-[N, N-bis(3,4-dimethylphenyl) amino]-[2(triethoxysilyl)ethyl]benzene 40 mL of toluene, 6.0 g of triethoxysilane, and 0.54 mmol of tris (tetramethyldivinyldisiloxane) platinum (0) complex in a toluene solution were placed in a three-neck flask, and while stirring under room temperature, 20 mL of a toluene solution of 9.9 g of 4-[N, N-bis(3,4-dimethylphenyl)amino] styrene was added. Upon completion of the addition, the mixture was stirred for 3 hours at 70° C.; the solvent was then removed under reduced pressure, and a lemon-yellow oil of 4-[N, N-bis(3, 4-dimethylphenyl)amino]-[2 (triethoxysilyl)ethyl]benzene was obtained. The amount was 13.4 g (90.1%).

SYNTHESIS EXAMPLE 5

Synthesis of 4-bromotriphenylamine 8.0 g (45 mmol) of N-bromosuccinimide and 10.0 g (41 mmol) of triphenylamine were placed in a 200 mL three-neck flask and then 150 mL of N,N-dimethylformamide was added. The mixture were stirred overnight at room temperature. N,N-dimethylformamide was removed, and the obtained solid was extracted with carbon tetrachloride. The solvent was removed, and the crude product was twice recrystallized from ethanol. As a result, a white solid of 4-bromotriphenylamine was obtained in an amount of 8.2 g (61.7%).

Synthesis of 4-(N,N-diphenylamino)allylbenzene 1.0 g (40 mmol) of magnesium metal was placed in a 300 mL four-neck flask was filled with and the flask under nitrogen atmosphere. 100 mL of ether was added, and stirring was initiated. Then 30 mL of an ether solution of 8.6 g (27 mol) of 4bromotriphenylamine was slowly added by dropwise to the mixture. Adding 3 mL, refluxing was slowly started. In the course of refluxing, the addition of the diethylether solution was continued. Upon completion of the addition, refluxing was carried out for another 20 hour. The Grignard reagent solution was cooled to room temperature and was then combined with 40 mL of an ether solution of 2.1 g (27 mmol) of allyl chloride added slowly. Upon completion of the addition, the mixture was refluxed for 2 hours to complete the reaction. 50 mL of Ice-cold water was then added, and hydrolysis was carried out. The ether layer was extracted, washed once with an aqueous solution of saturated sodium bicarbonate and twice with water. The ether solution was then dried over anhydrous sodium sulfate. The ether was removed, and a white solid over 4-(N,N-diphenylamino)allylbenzene was obtained in an amount of 4.9 g (63.2%).

Synthesis of 4-[3-(triethoxysilyl)propyl] triphenylamine 40 mL of toluene, 6.0 g (37 mmol) of triethoxysilane, and 0.54 mmol of tris(tetramethyldivinyldisiloxane)platinum (0) complex in a toluene solution were loaded into a three-neck flask. While being stirred at room temperature, 20 mL of a toluene solution of 9.7 g (34 mmol) of 4-(N, N-diphenylamino)allylbenzene was added. Upon completion of the addition, the mixture was stirred for 3 hours at 70° C.; the solvent was removed under reduced pressure, and a lemon-yellow oil of 4-[3-(triethoxysilyl)propyl] triphenylamine was obtained in an amount of 10.7 g (70.1%).

SYNTHESIS EXAMPLE 6

Synthesis of 4-methyltriphenylamine 4.5 g (27 mmol) of diphenylamine, 11.0 g (51 mmol) of piodotoluene, 5.5 g (40 mmol) of anhydrous potassium carbonate, and 1.1 g of copper chips were added to 30 mL of o-dichlorobenzene, and the mixture was refluxed for 7 hours with stirring. Upon completion of the reaction, the solution was filtered, the filtrate was washed with a 3 to 5% aqueous solution of sodium thiosulfate and then with a saturated brine. After drying the organic layer with an anhydrous sodium sulfate, the solvent was removed. The crude product was recrystallized from ethanol, whereby 4-methyltriphenylamine was obtained in an amount of 5.7 g (81.4 %).

Synthesis of 4-bromomethyltriphenylamine 6.9 g (39 mmol) of N-bromosuccinimide and 9.1 g (35 mmol) of 4-methyl triphenylamine were loaded in a 300 mL three-neck flask, and then 100 mL of carbon tetrachloride was added. The mixture was stirred overnight. Upon completion of the reaction, the solution was cooled and then filtered. The solvent was removed. The crude product was recrystallized from ethanol. 4-bromomethyltriphenylamine was resulted in an amount of 10.8 g (91.2%).

Synthesis of 4-(N,N-diphenylamino)phenyl-l-butene

A 200 mL four-neck flask was loaded with 1.0 g (40 mmol) of magnesium metal under nitrogen atmosphere. Diethyl ether was added in an amount of 100 mL, and stirred. Then 20 mL of a diethyl ether solution of 9.1 g (27 mmol) of 4-bromomethyltriphenylamine was slowly added to the stirred mixture. In the course of refluxing, the addition of the diethylether solution was continued. Upon completion of addition, refluxing was carried out for another hour. The Grignard reagent solution was cooled to room temperature and was then combined with 20 mL of a diethylether solution of 2.1 g (27 mmol) of allyl chloride added slowly. Upon completion of the addition, the mixture was refluxed for 2 hours to complete the reaction. Ice-cold water was then added in an amount of 50 mL, and hydrolysis was carried out. The ether layer was extracted, washed once with an aqueous solution of a saturated sodium bicarbonate and twice with water. The product was then dried over anhydrous sodium sulfate. The diethylether was removed, and a white solid of 4-(N,N-diphenylamino)phenyl-l-butene was obtained in an amount of 5.5 g (66.7%).

Synthesis of 4-[4-(triethoxysilyl)butyl] triphenylamine 40 mL of toluene, 9.9 g (60 mmol) of triethoxysilane, and 0.018 mmol of tris (tetramethyldivinyldisiloxane)platinum (0) complex in a toluene solution were placed in a three-neck flask, and while stirring under room temperature, 20 mL of a toluene solution of 16.7 g (54.7 mmol) of 4-(N,N-diphenylamino)phenyl-l-butene was dropped. Upon completion of the addition, the mixture was stirred for 3 hours at 70° C. Then the solvent was removed under reduced pressure. 4-[4 (triethoxysilyl)butyl]-triphenylamine was obtained as a lemon-yellow oil in an amount of 13.9 g (83.2%).

PRACTICAL EXAMPLE 1

10 g of polysiloxane resin consisting of 80 mole % methylsiloxane units and 20 mole % dimethylsiloxane units was dried over 4A molecular sieves (with OH groups connected in the polysiloxane resin to silicone atoms in an amount of 2 wt. %) for below 50 ppm of water in them. The resin was dissolved in 10 g of toluene, wherein with 5.3 g of methyltri(methoxy)silane and 0.2 g of dibutyltin diacetate were added. 70 parts of 4-[2-triethoxysilyl)ethyl] triphenylamine was mixed with obtained in Synthesis Example 1 and, 100 parts by weight of resin in toluene solution. The mixture was applied as a coating onto a glass plate. The coating was dried for 15 hours at 140° C. Observations under a microscope confirmed that a uniform film was formed.

The coating solution was cast on a clean 5 cm×5 cm aluminum plate and then it was then heated for 15 hours at 140° C. and hardened. A 12 $\mu$m thick film was resulted. 1 kV of minus charge was loaded on the surface of the film by means of a corona discharge and 1 kV of charge was applied to one side of the aluminum plate through DC power supply (Mod. TR6120, the product of Advantest Co., Ltd.). Measurements on the potential on the surface of the film predicted 600 V by means of a surface potential meter (TREK142000).

By the same method, a film was formed on an ITO glass plate with the use of the coating solution prepared above and gold as an counter-electrode coating was applied onto the film by evaporation. Drift mobility of holes was measured by the Time-of-Flight (TOF) method under a 337 nm $N_2$ laser irradiation on the metal electrode side.

Mobility was equal to $7 \times 10^{-8}$ cm²/Vs. extrapolated at room temperataure.

PRACTICAL EXAMPLE 2

A uniform film was formed and checked in the same manner as in Practical Example 1, with the exception that 12 g of siloxane resin consisting of 40 mole % phenylsiloxane units, 20 mole % diphenylsiloxane units, 20 mole % methylsiloxane units, and 20 mole % dimethylsiloxane units were used (with OH groups connected in the polysiloxane resin to silicone atoms in an amount of 0.8 wt. %).

PRACTICAL EXAMPLE 3

A uniform transparent film was formed in the same manner as in Practical Example 1 by adding 60 parts by weight of 4-[N,N-bis (3,4-dimethylphenyl)amino]-[2-(triethoxysilyl)ethyl]benzene obtained in Synthesis Example 4 to the methylpolysiloxane resin used in Practical Example 1.

PRACTICAL EXAMPLE 4

A uniform transparent film was formed in the same manner as in Practical Example 1 by adding 60 parts by weight of 4-[2(methyldiethoxysilyl)ethyl]-triphenylamine obtained in Synthesis Example 2 to the methylpolysiloxane resin used in Practical Example 1.

PRACTICAL EXAMPLE 5

A uniform transparent film was formed in the same manner as in Practical Example 1 by adding 60 parts by weight of 4,4', 4".tris [2- (triethoxysilyl) ethyl] -triphenylamine obtained in Synthesis Example 3 to the methylpolysiloxane resin used in Practical Example 1.

PRACTICAL EXAMPLE 6

A uniform transparent film was formed in the same manner as in Practical Example 1 by adding 60 parts by weight of 4-[3(triethoxysilyl)propyl] triphenylamine obtained in Synthesis Example 5 to the methylpolysiloxane resin used in Practical Example 1.

PRACTICAL EXAMPLE 7

A uniform transparent film was formed in the same manner as in Practical Example 1 by adding 60 parts by weight of 4-[4(triethoxysilyl)butyl]triphenylamine obtained in Synthesis Example 6 to the methylpolysiloxane resin used in Practical Example 1.

COMPARATIVE EXAMPLE 1

A film was formed by dissolving 30 parts by weight of triphenylamine per 100 parts by weight of resin in the resin solution of Practical Example 1. The solution was then mixed and cured. The film was in the form of a white suspension, and a precipitate of triphenylamine could be seen under a microscope.

COMPARATIVE EXAMPLE 2

A reaction was carried out in the same manner as in Synthesis Example 1, with the exception that 6 g (60 mmol) of trimethylsilane were used for the reaction with 4-vinyltriphenylamine obtained in Synthesis Example 1. As a result, 4-[2-(trimethylsilyl)ethyl]triphenylamine was obtained. This product was used to form a film in the same manner as in Comparative Example 1. The film was not transparent, and 4-[2-(trimethylsilyl)ethyl]- triphenylamine was subject to separation.

We claim:

1. A method of manufacturing a polysiloxane material having charge transporting properties, the method comprising:

dissolving a charge transporting material having an ionization potential within the range of 4.5 to 6.2 eV and represented by the formula:

wherein A denotes an organic group derived from a charge transporting compound having the ionization potential of 4.5 to 6.2 eV, which is an aromatically substituted tertiary amine having a plurality of aromatic groups where at least one of the aromatic hydrocarbon groups is bonded to $R^1$ which is an alkylene group having 1 to 18 carbon atoms; $R^2$ is a monovalent hydrocarbon group or a halogen-substituted monovalent hydrocarbon group having 1 to 15 carbon atoms; Q is a hydrolyzable group; n is an integer from 1 to 3; p is an integer from 1 to 3 and a curable polysiloxane resin having a ratio of monovalent hydrocarbon groups to silicon atoms in a range of 0.5 to 1.5 in an organic solvent which is essentially free of water;

mixing the charge transporting material and curable polysiloxane resin to form a mixture thereof;

and curing the mixture.

2. The method of claim 1 wherein said curable polysiloxane resin is represented on average by the formula:

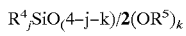

where $R^4$ is a linear or a branched monovalent saturated hydrocarbon group having 1 to 18 carbon atoms, $R^5$ is a hydrogen atom or an alkyl group with 1 to 4 carbon atoms, j is a number between 0.5 and 1.5, and k has a value such that the content of $OR^5$ groups in the polysiloxane resin is within the range of 0.01 to 10 weight percent.

3. The method of claim 1 wherein the charge transporting material is admixed in an amount of 20 to 200 parts by weight per 100 parts by weight of the polysiloxane resin.

4. The method of claim 2 wherein the charge transporting material is admixed in an amount of 20 to 200 parts by weight per 100 parts by weight of the polysiloxane resin.

5. The method of claim 2 wherein Q is an alkoxy group having from 1 to 6 carbon atoms.

6. The method of claim 5 wherein $R^5$ is a hydrogen atom and the polysiloxane resin contains 0.1 to 4 weight percent of OH groups bonded to silicon atoms.

7. The method of claim 6 wherein the charge transporting material is admixed in an amount of 30 to 150 parts by weight per 100 parts by weight of the polysiloxane resin.

8. The polysiloxane material having charge transporting property made by the method of claim 1.

9. The polysiloxane material having charge transporting property made by the method of claim 2.

10. The polysiloxane material having charge transporting property made by the method of claim 3.

11. The polysiloxane material having charge transporting property made by the method of claim 4.

12. The polysiloxane material having charage transporting property made by the method of claim 5.

13. The polysiloxane material having charge transporting property made by the method of claim 6.

14. The polysiloxane material having charge transporting property made by the method of claim 7.

* * * * *